(12) United States Patent
Wang et al.

(10) Patent No.: US 8,545,690 B1
(45) Date of Patent: Oct. 1, 2013

(54) PURIFICATION METHOD OF ZINC SULFATE LEACHATE

(75) Inventors: Jikun Wang, Yunnan (CN); Ying Dong, Yunnan (CN); Guangshen He, Yunnan (CN); Changwu Zhou, Yunnan (CN); Guobang Zhu, Yunnan (CN); Jiancun Wu, Yunnan (CN)

(73) Assignees: Yunnan Metallurgical Group Co., Ltd., Kunming, Yunnan (CN); Yunnan Yongchang Pb&Zn Co., Ltd., Baoshan, Yunnan (CN)

( * ) Notice: Subject to any disclaimer, the term of this patent is extended or adjusted under 35 U.S.C. 154(b) by 0 days.

(21) Appl. No.: 13/480,589

(22) Filed: May 25, 2012

(51) Int. Cl.
*C25C 1/16* (2006.01)
*C22B 3/08* (2006.01)
*C22B 3/46* (2006.01)

(52) U.S. Cl.
USPC ............. 205/604; 75/724; 75/726; 75/730; 75/738

(58) Field of Classification Search
None
See application file for complete search history.

(56) References Cited

U.S. PATENT DOCUMENTS 3,994,721 A * 11/1976 Bienvenu et al. ............... 75/370
4,240,826 A * 12/1980 Kangas et al. .................. 75/731
4,355,009 A * 10/1982 Stewart ........................ 423/101
4,378,275 A * 3/1983 Adamson et al. ............. 205/605
6,395,242 B1 * 5/2002 Allen et al. ................... 423/101

FOREIGN PATENT DOCUMENTS

EP 641741 A1 * 3/1995

OTHER PUBLICATIONS

Boyanov et al, Purification of zinc sulfate solutions from cobalt and nickel through activated cementation, Hydrometallurgy, vol. 73, 2004, pp. 163-168.*
Polcaro et al, Kinetics of Cobalt Cementation on Zinc Powder, Industrial & Engineering Chemistry Research, vol. 34, No. 9, 1995, pp. 3090-3095.*
van der Pas et al, A fundamental strudy of cobalt cementation by zinc dust in the presence of copper and antimony additives, Hydrometallurgy, vol. 43, 1996, pp. 187-205.*
Nelson, Novel Activators in Cobalt Removal from Zinc Electrolyte by Cementation, Dept. of Mining and Metallurgical Engineering, McGill Univeristy, Monteal, Nov. 1998, indexed by Library and Archives Canada (www.collectionscanada.gc.ca), paper is available online at http://www.nlc-bnc.ca/obj/s4/f2/dsk1/tape8/PQDD_0028/MQ50646.pdf.*

* cited by examiner

*Primary Examiner* — Harry D Wilkins, III
(74) *Attorney, Agent, or Firm* — Houtteman Law LLC

(57) ABSTRACT

A purification method of zinc sulfate leachate is provided. The purification method of zinc sulfate leachate comprises contacting the zinc sulfate leachate with a zinc powder under a non-oxidizing atmosphere to form solution containing a precipitate of impurity metal; and removing the precipitate of impurity metal from the solution and getting a purified zinc sulfate leachate. A purified zinc sulfate leachate may be prepared with a higher purification efficiency and a lower energy consumption than prior art.

7 Claims, No Drawings

PURIFICATION METHOD OF ZINC SULFATE LEACHATE

FIELD

The present disclosure relates to metallurgical field. In particular, the present disclosure relates to a purification method of zinc sulfate leachate.

BACKGROUND

Currently, metallic zinc is mainly prepared from zinc sulfate leachate. The zinc sulfate leachate often contains contaminants such as a salt of impurity metal, for example copper, cadmium, cobalt and nickel and so one. Thus, the impurity metal should be removed from the leachate.

SUMMARY

The present disclosure is achieved based on the following findings of the inventor: In prior art, the impurity metal of zinc sulfate leachate is removed through contacting the zinc sulfate leachate with zinc powder, to form a precipitate of impurity metal. And the inventor first found that the precipitate is often formed with a low efficiency because the newly formed precipitate may often be solubilized by the leachate in presence of oxygen.

Embodiments of the present disclosure seek to solve at least one of the problems existing in the prior art to at least some extent, particularly problems of unsatisfactory purification efficiency of zinc sulfate leachate.

One aspect of the present disclosure, according to an embodiment of the present disclosure, provides a purification method of zinc sulfate leachate. According to an embodiment of present disclosure, the purification method of zinc sulfate leachate comprises the steps of: contacting the zinc sulfate leachate with a zinc powder under a non-oxidizing atmosphere to form solution containing a precipitate of impurity metal; and removing the precipitate of impurity metal from the solution and getting a purified zinc sulfate leachate. It has been unexpectedly found by the inventors that by contacting the zinc sulfate leachate with a zinc powder under a non-oxidizing atmosphere, the precipitate of impurity metal was formed at a significant higher efficiency than prior art, for example the efficiency of present technical solution maybe at least 2 times higher than the prior art.

It has been unexpectedly found by the inventors that by contacting the zinc sulfate leachate with a zinc powder under a non-oxidizing atmosphere, the precipitate of impurity metal was formed at a significant higher efficiency than prior art, for example the efficiency of present technical solution maybe at least 2 times higher than the prior art.

Additional aspects and advantages of embodiments of present disclosure will be given in part in the following descriptions, become apparent in part from the following descriptions, or be learned from the practice of the embodiments of the present disclosure.

DETAILED DESCRIPTION

Reference will be made in detail to embodiments of the present disclosure. The embodiments described herein are explanatory, illustrative, and used to generally understand the present disclosure. The embodiments shall not be construed to limit the present disclosure.

The present disclosure is achieved based on the following findings of the inventor: In prior art, the impurity metal of zinc sulfate leachate is removed through contacting the zinc sulfate leachate with zinc powder, to form a precipitate of impurity metal. And the inventor first found that the precipitate is often formed with a low efficiency because the newly formed precipitate may often be solubilized by the leachate in presence of oxygen.

One aspect of the present disclosure, according to an embodiment of the present disclosure, provides a purification method of zinc sulfate leachate. According to an embodiment of present disclosure, the purification method of zinc sulfate leachate comprises the steps of: contacting the zinc sulfate leachate with a zinc powder under a non-oxidizing atmosphere to form solution containing a precipitate of impurity metal; and removing the precipitate of impurity metal from the solution and getting a purified zinc sulfate leachate. It has been unexpectedly found by the inventors that by contacting the zinc sulfate leachate with a zinc powder under a non-oxidizing atmosphere, the precipitate of impurity metal was formed at a significant higher efficiency than prior art, for example the efficiency of present technical solution maybe at least 2 times higher than the prior art.

According to the embodiment of present disclosure, contacting the zinc sulfate leachate with a zinc powder under a non-oxidizing atmosphere may further comprise: adding the zinc sulfate leachate into a purification container, subjecting the purification container under a non-oxidizing atmosphere by means of feeding nitrogen, and adding zinc powder to the zinc sulfate leachate with stirring.

The inventor found that when contacting the zinc sulfate leachate is brought into contact with zinc powder with stirring, the efficiency of purification will be further improved significantly. The stirring speed of about 250-350 rpm will be preferred, and the inventor surprisingly found that when stirring speed is above 350 rpm, the newly formed metallic precipitation may be destroyed by the stirring force, thus the efficiency of purification will be reduced significantly; and when the stirring speed is lower than 250 rpm, the contacting chance of zinc powder with the zinc sulfate leachate will be insufficient, thus the efficiency of purification will be reduced significantly.

According to an embodiment of the present disclosure, the method of adding zinc sulfate leachate into a purification container is not particularly limited. According to a specific embodiment of the present disclosure, zinc sulfate leachate is pumped into a purification container by using a pressure pump. Thus, zinc sulfate leachate can be effectively added into purification container. In the present disclosure, the term "zinc sulfate leachate" used should be broadly explained, which can be any zinc sulfate solution containing impurity metal elements to be purified.

In the purification method of zinc sulfate leachate according to an embodiment of the present disclosure, first of all, zinc sulfate leachate to be treated is added into a purification container. Consequently, after adding zinc sulfate leachate into the purification container, zinc powder is also added into the purification container under stir condition, so as to subject the zinc powder to a replacement-reaction with impurity elements contained, and then impurity elements are precipitated from zinc sulfate leachate. According to an embodiment of the present disclosure, Using copper as an example, replacement-reaction is:

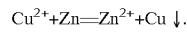

$Cu^{2+}+Zn=Zn^{2+}+Cu\downarrow$.

According to an embodiment of the present disclosure, zinc sulfate leachate can be produced from leaching process of zinc hydrometallurgy, and the impurity metal elements may comprise at least one of copper, cadmium, cobalt and nickel. And according to one specific embodiment of the present disclosure, the resulting purified zinc sulfate leachate may be further used to prepare metallic zinc, for example through an electro-deposition method, and the impurity metal elements contained in zinc sulfate leachate may be precipitated in a form of solid metal at the same time.

According to one embodiment of present disclosure, the precipitate of impurity metal may be removed by solid-liquid separation, thus the removed precipitate of impurity metal in form of solid metal may be further used to recycle the metal element. Then, the valued metals can be further recycled from zinc sulfate leachate, and environmental pollution can be decreased, and industry cost can also be reduced. The method of solid-liquid separation is not specially limited, such as plate and frame type filter press, rotary disc vacuum filter, etc., can be adopted.

According to one embodiment of present disclosure, the zinc sulfate leachate is subject to contact with a zinc powder under a non-oxidizing atmosphere. And the inventor found surprisingly that oxidation of the newly formed metal may be free of oxidation, and the formed metal precipitate will not be solubilized in the leachate. Thus, consumption of zinc powder and industry cost was reduced significantly, and purification efficiency was increased significantly, the purification can be achieved in a short time and impurity elements contained in purified zinc sulfate leachate is very low. According to an embodiment of the present disclosure, the non-oxidizing atmosphere may be achieved feeding nitrogen to the reaction system. According to a specific embodiment of the present disclosure, the pressure of nitrogen may preferably be 0.2-0.6 MPa. The inventor found surprisingly that, when the pressure goes beyond the range of 0.2-0.6 MPa, the purification efficiency may be reduced significantly under unknown reason. When the pressure of nitrogen is lower than 0.2 MPa, the content of nitrogen may be insufficient to prevent the newly formed metal reacting with oxygen. And the inventor surprisingly found that when the pressure of nitrogen exceeds 0.6 MPa, the purification efficiency will also be reduced significantly, perhaps because the pressure of the atmosphere may influence the replacement-reaction.

According to the embodiments of present disclosure, the addition amount of zinc powder is not particularly limited. According to a specific embodiment of the present disclosure, the addition amount of the zinc powder is 60-110 folds greater than the content of the impurity metal. The inventor found that the addition amount of the zinc powder may also influence the purification efficiency. And the inventor found that when the addition amount of the zinc powder goes beyond the range of 60-110 folds greater than the content of the impurity metal, the purification efficiency will be reduced significantly. According to one embodiment of the present disclosure, the mean particle size of the zinc powder is about 0.11 mm or below, namely the zinc powder having a particle size of less than 0.11 mm accounts for 88%~95%. Thus, the contact area of zinc powder with sulfate leachate may be increased significantly, and then further improve purification efficiency significantly.

According to an embodiment of the present disclosure, contacting the zinc sulfate leachate with a zinc powder under a non-oxidizing atmosphere is achieved at a temperature of about 85° C.-130° C. From then, speed of replacement-reaction will be increased, and purification efficiency is further improved. And the inventor surprisingly found that when the temperature goes above than 130° C., the purification efficiency may be significantly reduced under unknown reason. According to an embodiment of the present disclosure, time of contacting the zinc sulfate leachate with a zinc powder under a non-oxidizing atmosphere is not specially limited. In some specific embodiments of the present disclosure, time of replacement-reaction in purification container is 30-60 min. Thus, better purification efficiency can be achieved. And the inventor surprisingly found that when the time exceeds 60 min, the purification efficiency was reduced significantly.

Reference will be made in detail to embodiments of the present disclosure. The embodiments described herein are explanatory and illustrative, but shall not to limit scope of the present disclosure.

Embodiment 1

Using sulfuric acid to acid-leach zinc ore, getting zinc sulfate leachate, impurity compositions are tested (using predicating method to analyzing Cd, using atomic absorption method to analyze Cu, Co and Ni) (unit: mg/l):

Cu 19.42, Cd 533.33, Co 11.94, Ni 6.25

Zinc sulfate leachate is added into a pressure purification kettle using pump; temperature of purification kettle is controlled at 130° C.; nitrogen gas is ventilated and pressure of purification kettle is kept with 0.6 MPa; mechanical stirring speed is controlled at 300 rpm; at the same time, zinc powder (particle size less than 0.11 mm accounts for 88%) is slowly added into a pressure purification kettle at 2.3 kg/m$^3$. After 30 min reaction, the precipitated solution is pumped into a cooling tower until the temperature is cooled down to 95° C. After that, solid-liquid separation is conducted by using plate frame type filter, purified zinc sulfate solution and solid containing copper, cobalt, cadmium and nickel are obtained. Impurity compositions of purified zinc sulfate solution are tested (using Predicating method to analyzing Cd, using atomic absorption method to analyzing Cu, Co and Ni):

Cu 0.038, Cd 1.32, Co 1.45, Ni 0.36.

Embodiment 2

Using sulfuric acid to acid-leach zinc ore, getting zinc sulfate leachate, impurity compositions are (using Predicating method to analyzing Cd, using atomic absorption method to analyze Cu, Co and Ni) (unit: mg/l):

Cu 6.96, Cd 666.67, Co 28.0, Ni 10.5.

Zinc sulfate leachate is added into a pressure purification kettle using pump; temperature of purification kettle is controlled at 105° C.; nitrogen gas is ventilated and pressure of purification kettle is kept with 0.4 MPa; mechanical stirring speed is controlled at 300 rpm; at the same time, zinc powder (particle size less than 0.11 mm accounts for 90%) is slowly added into a pressure purification kettle at 3.1 kg/m$^3$. After 45 min reaction, the precipitated solution is pumped into a cooling tower until temperature is down to 90° C. After that, solid-liquid separation is conducted by using plate frame type filter, purified zinc sulfate solution and solid containing copper, cobalt, cadmium and nickel are obtained.

Impurity compositions of purified zinc sulfate solution are tested (using Predicating method to analyzing Cd, using atomic absorption method to analyzing Cu, Co and Ni):

Cu 0.088, Cd 0.95, Co 0.87, Ni 0.24.

Embodiment 3

Using sulfuric acid to acid-leach zinc ore, getting zinc sulfate leachate, impurity compositions are (using Predicating method to analyzing Cd, using atomic absorption method to analyzing Cu, Co and Ni) (unit: mg/l):

Cu 25.0, Cd 589.6, Co 9.6, Ni 10.43.

Zinc sulfate leachate is added into a pressure purification kettle using pump; temperature of purification kettle is controlled at 85° C.; nitrogen gas is ventilated and pressure of purification kettle is kept with 0.2 MPa; mechanical stirring speed is controlled at 300 rpm; at the same time, zinc powder (particle size less than 0.11 mm accounts for 92%) is slowly added into a pressure purification kettle at 2.8 kg/m$^3$. After 60 min reaction, the precipitated solution is pumped into a cooling tower until temperature is down to 85° C. After that, solid-liquid separation is conducted by using plate frame type filter, purified zinc sulfate solution and solid containing copper, cobalt, cadmium and nickel are obtained.

Impurity compositions of purified zinc sulfate solution are tested (using Predicating method to analyzing Cd, using atomic absorption method to analyzing Cu, Co and Ni):

Cu 0.062, Cd 1.17, Co 1.00, Ni 0.24.

Embodiment 4

Using sulfuric acid to acid-leach zinc ore, getting zinc sulfate leachate, impurity compositions are (using Predicating method to analyzing Cd, using atomic absorption method to analyzing Cu, Co and Ni) (unit: mg/l):

Cu 111.25, Cd 617.65, Co 20.27, Ni 9.58.

Zinc sulfate leachate is added into a pressure purification kettle using pump; temperature of purification kettle is controlled at 120° C.; nitrogen gas is ventilated and pressure of purification kettle is kept with 0.4 MPa; mechanical stirring speed is controlled at 300 rpm; at the same time, zinc powder (particle size less than 0.11 mm accounts for 95%) is slowly added into a pressure purification kettle at 3.3 kg/m$^3$. After 40 min reaction, the precipitated solution is pumped into a cooling tower until temperature is down to 90° C. After that, solid-liquid separation is conducted by using plate frame type filter, purified zinc sulfate solution and solid containing copper, cobalt, cadmium and nickel are obtained. Impurity compositions of purified zinc sulfate solution are tested (using Predicating method to analyzing Cd, using atomic absorption method to analyzing Cu, Co and Ni):

Cu 0.029, Cd 1.29, Co 1.49, Ni 0.27.

Embodiment 5

Using sulfuric acid to acid-leach zinc ore, getting zinc sulfate leachate, impurity compositions are (using Predicating method to analyzing Cd, using atomic absorption method to analyzing Cu, Co and Ni) (unit: mg/l):

Cu 21.0, Cd 560.3, Co 8.45, Ni 9.23.

Zinc sulfate leachate is added into a pressure purification kettle using pump; temperature of purification kettle is controlled at 85° C.; nitrogen gas is ventilated and pressure of purification kettle is kept with 0.4 MPa; mechanical stirring speed is controlled at 300 rpm; at the same time, zinc powder (particle size less than 0.11 mm accounts for 93%) is slowly added into a pressure purification kettle at 2.65 kg/m$^3$. After 60 min reaction, the precipitated solution is pumped into a cooling tower until temperature is down to 85° C. After that, solid-liquid separation is conducted by using plate frame type filter, purified zinc sulfate solution and solid containing copper, cobalt, cadmium and nickel are obtained. Impurity compositions of purified zinc sulfate solution are tested (using Predicating method to analyzing Cd, using atomic absorption method to analyzing Cu, Co and Ni):

Cu 0.062, Cd 0.88, Co 1.00, Ni 0.27.

According to above embodiments, it can be seen from that a purification method of zinc sulfate leachate according to an embodiment of the present disclosure can purify the zinc sulfate leachate in short time, and the amount of impurity metal of resulting purified zinc sulfate leachate can meet the requirement of electroplating process.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A purification method of zinc sulfate leachate, comprising:

contacting the zinc sulfate leachate with a zinc powder under a non-oxidizing atmosphere to form solution containing a precipitate of impurity metal, wherein the mean particle size of the zinc powder is between 0.10 mm and 0.11 mm; and removing the precipitate of impurity metal from the solution and getting a purified zinc sulfate leachate, wherein contacting the zinc sulfate leachate with a zinc powder under a non-oxidizing atmosphere further comprising:

adding the zinc sulfate leachate into a purification container;

subjecting the purification container under a non-oxidizing atmosphere; and adding zinc powder to the zinc sulfate leachate with stirring, wherein the stirring speed is about 250-350 rpm, wherein the non-oxidizing atmosphere is a nitrogen atmosphere, and a pressure of the nitrogen atmosphere is 0.2-0.6 MPa, and the addition amount of the zinc powder is 60~110 folds greater than the content of the impurity metal.

2. The method of claim 1 wherein removing the precipitate of impurity metal from the solution is achieved by means of solid-liquid separation.

3. The method of claim 1, wherein the zinc sulfate solution is a sulfate leachate of zinc ore.

4. The method of claim 1, wherein the impurity metal is at least one selected from copper, cobalt, cadmium and nickel.

5. The method of claim 1, wherein further comprises:

recycling the impurity metal from the solid containing impurity precipitation.

6. The method of claim 1, wherein contacting the zinc sulfate leachate with a zinc powder under a non-oxidizing atmosphere is achieved at a temperature of about 85° C.-130° C.

7. The method of claim 1, further comprising a step of preparing metallic zinc by electro-deposition method form the purified zinc sulfate leachate.

* * * * *